United States Patent [19]

Szlaga

[11] Patent Number: 4,655,238

[45] Date of Patent: Apr. 7, 1987

[54] ROLL-OVER VALVE

[75] Inventor: Emil Szlaga, Connersville, Ind.

[73] Assignee: Stant Inc., Connersville, Ind.

[21] Appl. No.: 837,152

[22] Filed: Mar. 7, 1986

[51] Int. Cl.$^4$ ............................................. F16K 17/36
[52] U.S. Cl. ....................................................... 137/43
[58] Field of Search ............................. 137/38, 39, 43

[56] References Cited

U.S. PATENT DOCUMENTS

| | | | |
|---|---|---|---|
| 1,683,338 | 9/1928 | Evinrude | 137/43 |
| 2,396,233 | 3/1946 | Abrams | 137/43 X |
| 3,996,951 | 12/1976 | Parr et al. | 137/43 |
| 4,095,609 | 6/1978 | Martin | 137/43 |
| 4,162,021 | 7/1979 | Crute | 137/43 X |
| 4,351,350 | 9/1982 | Crute | 137/43 X |

Primary Examiner—Robert G. Nilson
Attorney, Agent, or Firm—Barnes & Thornburg

[57] ABSTRACT

An improved roll-over valve includes a hollow valve housing, a valve member in the valve housing, and a base for retaining the valve member in the valve housing. A ball is provided for moving the valve member within the valve housing. The valve member is positioned within the hollow valve housing for movement generally along a longitudinal axis between an outlet-opening and -closing position. The valve member includes a ball-receiving cup configured to define a first inclined ramp portion. The base retains the valve member within the housing and includes a second inclined ramp portion. The base is coupled to the valve housing the present the first and second inclined ramp portions in opposing spaced-apart relation to define a ball-receiving space therebetween. The ball is positioned in the ball-receiving space in substantially camming relation to each of the opposing first and second inclined ramp portions. The ball rides on both ramp portions to move the valve member to its outlet-closing position in response to tilting the valve housing about its longitudinal axis during a vehicle rollover and during abrupt changes to vehicle motion.

23 Claims, 5 Drawing Figures

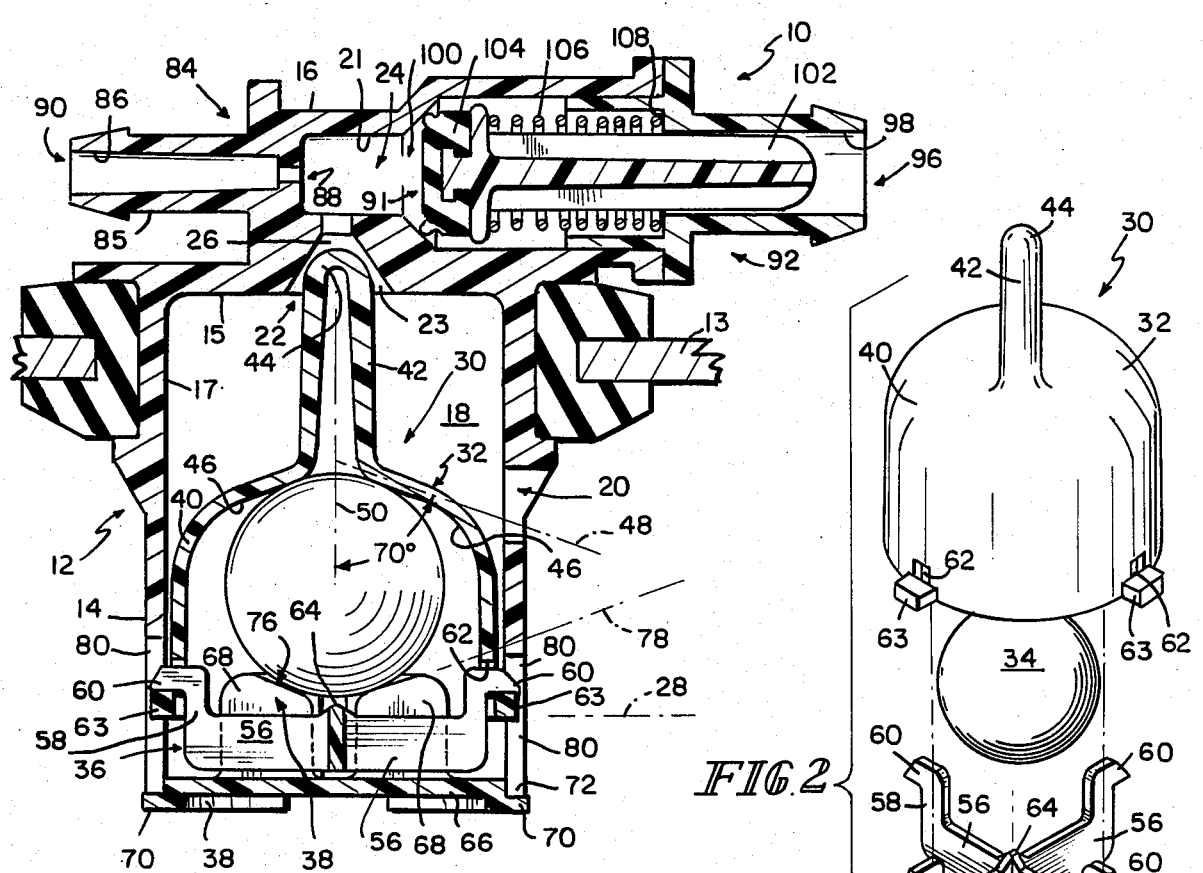
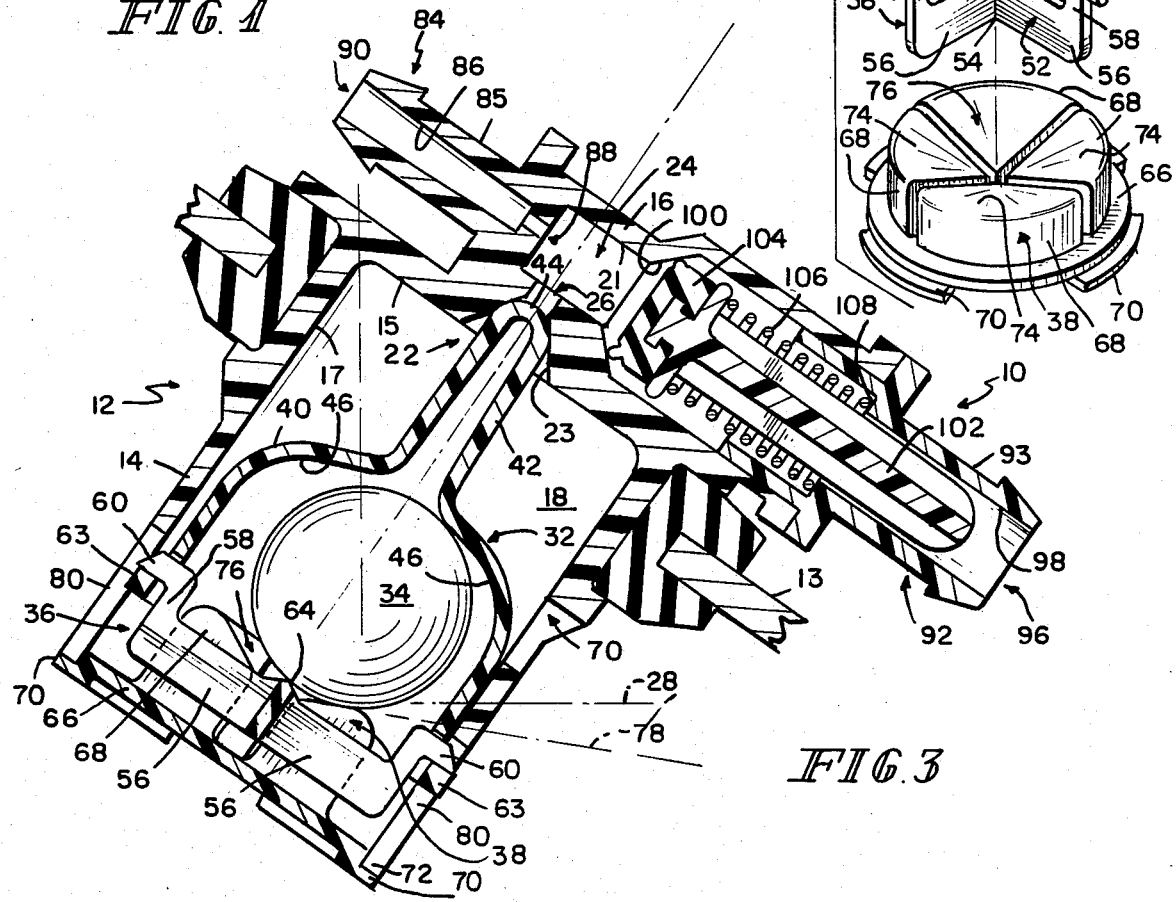

ROLL-OVER VALVE

BACKGROUND AND SUMMARY OF THE INVENTION

The present invention relates to fuel system valves, and particularly to a roll-over valve for closing a venting passageway in a vehicle fuel system if the vehicle is rolled over in an accident. More particularly, the present invention relates to a fuel tank pressure-regulated roll-over valve having a vapor release valve for selectively discharging a controlled volume of fuel vapor from the fuel tank to the atmosphere.

Vehicle fuel systems are known to include pressure-relief roll-over safety valves mountable on either fuel tanks or filler necks. These conventional valves are not equipped to discharge fuel vapor from the fuel system directly into the atmosphere. Hereinafter, these conventional valves will be referred to as "closed system fuel tank valves."

Closed-system fuel tank valves are known to include a pressure-relief system for discharging fuel vapors from the fuel tank to a conventional vapor treatment canister filled with activated charcoal or other substrate. It is also known to couple a separate roll-over safety system to the venting pressure-relief system. The roll-over safety system prevents hazardous discharge of fuel from the fuel tank through the venting pressure-relief system during vehicle rollover and fuel sloshing.

Typically, the closed-system fuel tank valve includes a fluid/vapor-conducting passageway interconnecting the pressure-relief and roll-over safety systems. Roll-over safety systems are known to include a valve ball housing having therein a freely movable valve ball and valve stem. When the fuel tank valve is tilted relative to a normal upright orientation during vehicle rollover and when the valve ball is ramped during vehicle acceleration and deceleration, the valve ball causes the valve stem to close the passageway thereby blocking discharge of fuel and fuel vapor from the fuel tank to the canister and atmosphere.

Operating problems have been observed with engines (particularly, engines having fuel injection systems) in vehicles having conventional "closed-system fuel tank valves". In particular, these engines do not perform very well under hot environmental conditions. These engine performance problems are caused chiefly by conventional closed-system fuel tank valves that discharge an excessive mass of fuel vapor from the fuel tank into the canister. If liquid fuel overloads the carbon surface in the canister with difficult to purge heavy hydrocarbons, then system efficiency will be reduced to a low level.

Droplets of fuel entrained in the fuel vapor are adsorbed onto the carbon substrate in the canister. Filtered air sweeps through the canister charcoal bed in response to a pressure-differential applied to the canister simultaneously desorbing the stored fuel vapors and conducting the desorbed vapors into the engine intake manifold. Engine performance is hampered by introduction of excess fuel into the engine resulting from discharge of excess fuel vapor into the canister. Mounting the canister in a high position relative to the fuel tank to lessen carryover potential has proven to be unfeasible and impractical due to packaging requirements.

An improved fuel tank valve having a purge valve means for selectively releasing fuel vapor directly to the atmosphere would advantageously minimize fuel tank pressure. At the same time, the improved valve would reduce fuel vapor mass flow to the canister, thereby reducing the mass of fuel drawn into the engine from the canister, enhancing engine performance, and avoiding shortcomings of known fuel tank valves.

According to the present invention, a roll-over valve is provided for use in a vehicle fuel system to satisfy government regulations requiring that sufficient precautions be taken to prevent fuel from leaking out of the vehicle fuel tank into a vent line leading to the canister and/or the atmosphere when the vehicle is subjected to a prescribed vehicle rollover test. The roll-over valve includes a hollow valve housing, a valve member in the valve housing, and base means for retaining the valve member in the valve housing. In addition, a ball is provided for moving the valve member within the valve housing in response to tilting movement of the valve housing relative to a normal upright position and abrupt change in vehicle motion. For example, tilting generally occurs when the vehicle is rolled over in an accident.

The hollow valve housing includes a longitudinal axis, an inlet for admitting fuel vapors from the vehicle fuel system into the valve housing, and an outlet for discharging the fuel vapors from the valve housing. The valve member is positioned within the hollow valve housing for movement generally along the longitudinal axis between an outlet-opening position and an outlet-closing position. The valve member includes a ball-receiving cup configured to define a novel first inclined ramp portion.

The base means retains the valve member within the housing and includes a second inclined ramp portion. The base means is coupled to the valve housing to present the second inclined ramp portion in opposing spaced-apart relation to the novel first inclined ramp portion of the cup to define a ball-receiving space therebetween. The ball is positioned in the ball-receiving space in substantially camming relation to each of the opposing first and second inclined ramp portions. The ball rides on both ramp portions to move the valve member to its outlet-closing position in response to tilting the valve housing about its longitudinal axis during a vehicle rollover and during abrupt change to vehicle motion.

In preferred embodiments of the present invention, the roll-over valve includes vapor distribution means for discharging a substantially constant volumetric flow rate of fuel vapor from the hollow valve housing to a vapor storage canister within the vehicle fuel system. The roll-over valve also includes vapor release means for selectively discharging a controlled volume of fuel vapor from the hollow valve housing to the atmosphere. The vapor release means advantageously minimizes fuel system pressure and reduces the mass flow rate of fuel vapor to the vapor storage canister. In other preferred embodiments, the roll-over valve can include vent means for regulating the pressure in the fuel tank.

Illustratively, the first inclined ramp portion is substantially defined by a downwardly-extending generatrix, and the second inclined ramp portion is substantially defined by an upwardly-extending generatrix. In particular, the downwardly-extending generatrix has an included angle with the longitudinal axis of the valve housing of about 70°, and the upwardly-extending generatrix also has an included angle with the longitudinal axis of the valve housing of about 60° to 70°.

One feature of the present invention is the provision of opposing first and second inclined ramp portions cooperatively engaging the valve member-moving ball in substantially camming relation. This "double-ramp" feature effectively increases the travel of the valve member along the longitudinal axis of the housing during tilting of the valve housing caused by vehicle rollover or abrupt changes in vehicle without requiring a corresponding increase in the travel of the ball along the longitudinal housing axis. Advantageously, the "double-ramp" feature of the present invention increases valve member "lift" without enlarging either the interior of the hollow valve housing or the ball-receiving space defined by the first inclined ramp portion of the valve member cup and the opposing second inclined ramp portion of the base means. Such a feature is particularly advantageous in a roll-over valve having an atmospheric vapor release valve due to a significant reduction in interior space within the valve housing available for ball movement necessitated by inclusion of such an atmospheric vapor release valve as will be explained hereinafter.

Additional features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 1 is a sectional detail view of one embodiment of a valve in accordance with the present invention showing the valve in a normal, upright position;

FIG. 2 is an exploded assembly view of one portion of the valve shown in FIG. 1;

FIG. 3 is a view of the valve illustrated in FIG. 1 showing the valve in a tilted position;

DETAILED DESCRIPTION OF THE DRAWINGS

Figure 5:
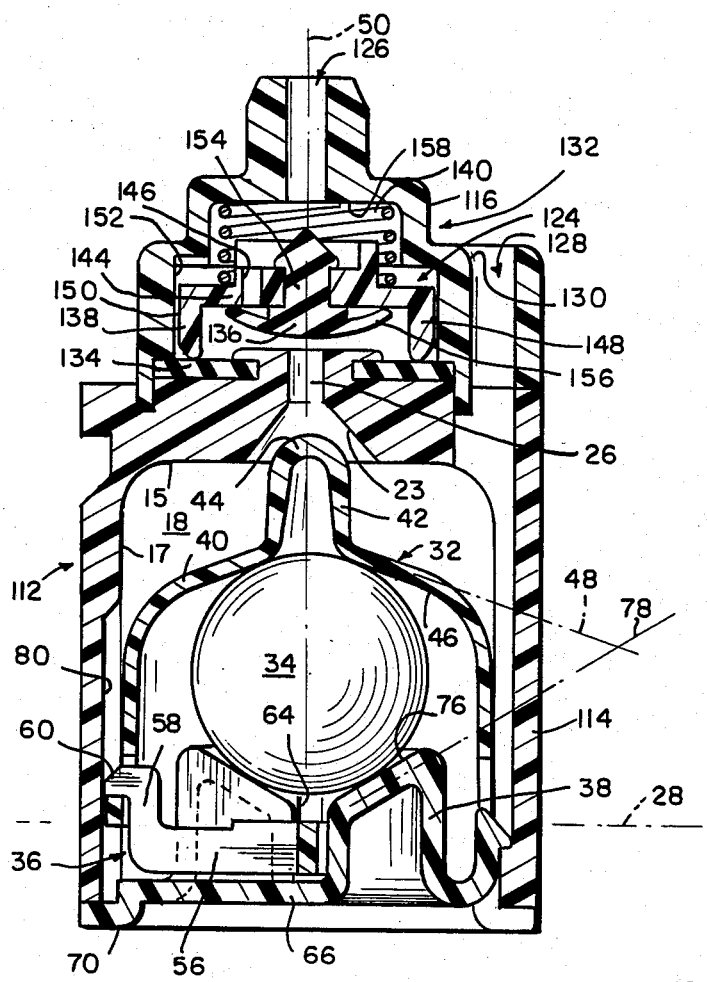
FIG. 5 is a sectional detail view of yet another embodiment of the present invention.

A first embodiment of the invention is illustrated in FIGS. 1-3. A valve assembly 10 is provided for use with a conventional fuel system (not shown) having a fuel tank and a fuel vapor storage canister. Referring particularly to FIGS. 1 and 3, the valve assembly 10 includes a hollow valve housing 12 mounted to a wall 13 of a fuel tank or the like and having a lower roll-over safety portion 14 and an upper pressure-relief portion 16.

The lower roll-over safety portion 14 includes a top wall 15 and a generally cylindrical side wall 17 which cooperate to define a valve chamber 18 having an inlet 20 formed in the side wall 17 and an outlet 22 formed in the top wall 15. The inlet 20 is in fluid/vapor communication with a fuel tank or the like. The lower portion 14 is formed to include an axially downwardly-facing, generally conical valve seat 23 in concentric registry with outlet 22.

The upper pressure-relief portion 16 is formed to include an interior wall 21 defining a vapor discharge chamber 24, and a passageway 26 interconnecting the vapor discharge chamber 24 and the outlet 22 of the valve chamber 18 in fluid/vapor communication. During vehicle operation, fuel vapors accumulated in the fuel tank are introduced into the valve chamber 18 under pressure. These fuel vapors are selectively transmitted via fluid-conducting passageway 26 to the vapor discharge chamber 24 for subsequent distribution to the canister (not shown) and to the atmosphere.

A roll-over assembly 30 is installed in the lower portion 14 to control fluid flow through the fluid-conducting passageway 26. The roll-over assembly 30 automatically closes the valve chamber outlet 22 during vehicle rollover and change in vehicle motion to prevent the flow of liquid fuel and/or fuel vapors through passageway 26 and into both of the canister and the atmosphere, thereby lessening the danger of explosion or other hazard.

As soon as a rolled-over vehicle is substantially returned to an upright position, the roll-over assembly 30 functions to open the valve chamber outlet 22 to permit resumption of unimpeded flow of fuel vapors through passageway 26. As shown best in FIG. 2, the roll-over assembly 30 includes a valve member 32, a stainless steel ball 34, a ball retainer 36, and a valve member retainer 38. The roll-over assembly 30 can be preassembled in a manner described below and installed in the valve chamber 18.

The valve member 32 includes a downwardly opening ball-receiving cup 40 and an integral upstanding valve stem 42. The valve stem 42 has a distal, spherical end 44 for engaging valve seat 23 to close the chamber outlet 22. An interior wall of the cup 40 is configured to define a novel first inclined ramp portion 46. As shown best in FIG. 1, the first inclined ramp portion 46 is substantially defined by a downwardly-extending generatrix 48 to present a downwardly-opening, outwardly-extending, contoured, flared camming surface. Illustratively, the first inclined ramp portion 46 is positioned in relation to the longitudinal axis 50 of the valve housing 12 to define an included angle of about 70°. In other words, the novel first ramp portion 46 is inclined at an angle of about 20° relative to horizontal reference plane 28.

The ball retainer 36 includes a crisscross frame 52 for retaining the ball 34 in the inverted cup 40. The crisscross frame 52 includes a center portion 54 and four mutually perpendicular arms 56 extending away from center portion 54. Each arm 56 includes a distal end 58 and an outwardly turned L-shaped mounting tab 60 extending upwardly therefrom for snapping into engagement with four circumferentially spaced-apart mounting holes 62 formed in the lowermost portion of the inverted cup 40. A tab-supporting flange 63 is provided on the exterior of the cup 40 underneath each mounting hole 62 to support a mounting tab 60 extending therethrough. A raised contact surface 64 extends upwardly from the center portion 54 of the crisscross frame 52 to a point below the upwardmost extension of the mounting tabs 60.

The valve member retainer 38 illustratively includes a base member 66 and four integral upstanding wedge members 68 for retaining the valve member and ball retainer assembly 32, 36 in the valve housing 12. The base member 66 includes mounting flanges 70 for snapping into engagement with circumferentially spaced-apart channels 72 formed in the lowermost portion of valve housing 12 as shown best in FIGS. 1 and 3.

The distal ends 74 of upstanding wedge members 68 cooperate to define a second inclined ramp portion 76. As shown best in FIG. 1, the second inclined ramp portion 76 is substantially defined by an upwardly-extending generatrix 78 to present an upwardly-opening, outwardly-extending, contoured, flared camming surface. Illustratively, the second inclined ramp portion 76 is positioned in relation to the longitudinal axis 50 of the valve housing to define an included angle of about 70°. In other words, the second ramp portion 76 is inclined at an angle of about 20° relative to horizontal reference plane 28. Advantageously, the first and second inclined ramp portions 46, 76 cooperate to convert radially-outward movement of a ball disposed therebetween in camming relation into axially-upward movement of the valve stem 42 toward the chamber outlet 22 during tilting of the valve housing 12.

The roll-over assembly 30 illustrated in FIG. 2 is assembled and installed in the valve chamber 18 in the manner described below. When assembled, the valve member 32 is movable within the valve chamber 18 between a chamber outlet-opening position shown in FIG. 1 and a chamber outlet-closing position shown in FIG. 3.

The ball retainer 36 is coupled to the valve member 32 to retain a ball 34 disposed within the interior of the inverted cup 40 by inserting the mounting tabs 60 of the crisscross frame 52 into the respective mounting holes 62 formed in the cup 40 in abutting relation to the tab-supporting flanges 63. The valve member 32 and the ball retainer 36 are configured to permit movement of the trapped ball 34 in a radially-outward direction during tilting of the valve housing while substantially limiting movement in axially outward and inward directions. The valve member retainer 38 is then interengaged with the ball retainer 36 by inserting the four distal ends 74 of the upstanding wedge member 68 into the four spaces intermediate mutually-perpendicular frame arms 56. This "loose" assembly is then mounted in the valve housing 12 by: (1) inserting the valve stem 42 into the lower opening in the valve housing 12 so that the valve stem 42 extends through the chamber outlet 22 and is in close proximity to valve seat 23; (2) inserting mounting tabs 60 and companion tab-supporting flanges 63 into a like plurality of axially elongated circumferentially spaced-apart guide slots 80 formed in the valve housing 12 as shown in FIGS. 1 and 3; and then (3) interengaging the mounting flanges 70 of the base member 66 and the channels 72 formed in the valve housing 12.

When assembled, the valve member retainer 38 is fixed in relation to the valve housing 12 while the valve member and ball retainer assembly is guided by guide slots 80 for movement along the longitudinal axis 50 of the valve housing between chamber outlet-closing and -opening positions. In addition, when the valve member 32 is in its chamber outlet-opening position, the second inclined ramp portion 76 is situated to overlie the contact surface 64 so that the downwardly-presented surface of the ball 34 is seated on the second inclined ramp portion 76 without contacting the contact surface 64 of the ball retainer 36. As will be explained, the contact surface 64 provides means for transmitting the gravitational force of the ball 34 to the valve member 32 via the ball retainer 36 to aid in moving the valve member 32 from its outlet-closing position toward its outlet-opening position.

A discharge outlet 84 is provided in the upper pressure-relief portion 16 of the valve housing 12 for discharging a substantially constant volumetric flow rate of fuel vapor from the hollow valve housing 12 to a canister (not shown) as long as the pressure in vapor discharge chamber 24 stays at a constant pressure. The discharge outlet 84 includes an overflow tube 85 having a fluid-conducting passageway 86. The passageway 86 includes an inlet orifice 88 of uniform cross-section in fluid communication with the vapor discharge chamber 24 and an outlet 90 that is connectable to a conventional canister. Fuel vapors discharged from the fuel tank into the vapor discharge chamber 24 are distributable to the canister via discharge outlet 84.

A variable flow valve 92 is also provided in the upper pressure-relief portion 16 of the valve housing 12 for selectively discharging a controlled volume of fuel vapor from the hollow valve housing 12 to the atmosphere. The variable flow valve 92 includes a purge tube 93 having an inlet orifice 94 in fluid communication with the vapor discharge chamber 24, an outlet orifice 96 that empties into the atmosphere, and a fluid-conducting passageway 98 extending therebetween. The innermost portion of passageway 98 is formed to include a generally conical valve seat 100 in concentric registry with the inlet orifice 94. The valve seat 100 defines a diverging nozzle extending in a direction toward the outlet orifice 96.

In order to vary selectively the flow of fuel vapor to the atmosphere through passageway 98, an elongated valve stem 102 having a valve seal 104 at its innermost end is positioned in passageway 98. The valve seal 104 is yieldably urged into closing engagement with the valve seat 100 by means of a coiled compression spring 106 which seats on an abutment ring 108 formed to extend into the passageway 98 intermediate the inlet 94 and outlet 96.

In operation, ball 34 rides on both of the opposing first and second inclined camming surfaces 46, 76 to move the valve stem 42 upwardly into closing engagement with the valve seat 23 surrounding the chamber outlet 22 in response to tilting movement of the valve housing 12 during vehicle rollover and abrupt changes in vehicle motion. Illustratively, included angles of about 70° are formed between the longitudinal axis 50 and each of the ramp-defining, upwardly-extending and downwardly-extending generatrices, 78 and 48, respectively. These particular angles were selected so that the novel pair of opposing companion inclined surfaces would cooperate to convert radially outward movement of ball 34 into axially upward movement of valve member and ball retainer assembly 32, 36 so as to cause the valve stem 42 to move into closing engagement with valve seat 23 when the longitudinal axis 50 is tilted at least at an angle of about 35° (See FIG. 3) from its normal upright vertical position (See FIG. 1).

One object of the present invention is to provide a fuel tank valve having a roll-over safety valve, an integral flow orifice to control fuel vapor flow to the canister, and also an on/off vapor release valving mechanism for purging fuel tank vapors to the atmosphere. Advantageously, the vapor release valve provides means for venting selected amounts of fuel tank vapor to the atmosphere to improve hot engine performance by minimizing fuel tank pressure and reducing fuel vapor mass flow to the canister. The vapor release valve of the present invention permits excess pressure to be relieved to the atmosphere. This protects the purge air from becoming excessively saturated, and consequently, enhances vehicle driveability. The novel "double ramp" design of the roll-over assembly 30 effectively overcomes problems that were encountered during the development of a fuel tank valve having a canister discharge valve (e.g., 84) and an atmosphere discharge valve (e.g., 92).

During development of the fuel tank valve of the present invention, it became necessary to enlarge the chamber outlet orifice 22 to accommodate the increased fuel vapor flow rate created by the addition of atmospheric purge valve means 92, and also meet minimum performance criteria. One problem caused by enlargement of the chamber outlet orifice 22 was an increase in the differential pressure at the chamber outlet 22. This increased differential pressure increased an upwardly-directed applied force on the valve stem 42 in each of a roll-over and excessive vibration condition. This applied force acted to retain unnecessarily the valve stem 42 in its seated vent passageway-closing position (See FIG. 3) long after the rolled over vehicle (and tilted fuel tank valve) had been returned to an upright position (See FIG. 1) following an accident. Such an unwanted applied force has also been observed in cases where a vehicle fuel tank valve having an enlarged chamber outlet 22 is subjected to excessive vibration.

The foregoing developmental "valve closure" problem was alleviated in the present invention by increasing the mass of the ball 34 to increase the downwardly directed gravitational force of the ball 34 and thereby counteract the pressure- or vibration-induced upwardly-directed applied force on the valve stem 42. This was accomplished by enlarging the diameter of the ball 34 itself a sufficient amount to nearly double the weight of the ball 34. However, one problem caused by enlargement of the ball 34 was an effective reduction in the ball-receiving space defined by inverted cup 40 and the ball retainer 36. Packaging requirements prohibited increasing the volume of inverted cup 40 to compensate for enlargement of the ball 34. In effect, necessary enlargement of the ball diameter without increasing the cup diameter created a geometric condition that limited radially outward travel of trapped ball 34 and thereby reduced the axial travel of the valve member 32 in the valve chamber 18 during vehicle rollover. The effect of such a reduction in axial travel of the valve member 32 was that the ball 32 did not operate to lift the valve stem 42 into closing engagement with valve seat 23 when the longitudinal axis 50 of the valve housing 12 was tilted at an angle of about 20° relative to vertical during the vehicle roll-over accident.

The novel "double ramps" 46, 76 of the present invention provide a remedy to the foregoing developmental problems by increasing the vertical lift of the valve member 32 without necessitating enlargement of the volume of inverted cup 40 to provide space for increased radially outward movement of the valve member-driving ball 34 during vehicle rollover. Although each of the generatrices 48, 78 of camming ramps 46, 76 are inclined at an angle of about 20° in relation to horizontal reference plane 28, the positioning of camming ramps 46, 76 in opposing spaced-apart facing relation causes the camming ramps 46, 76 to cooperate to define an "effective ramp surface" of about 40° in relation to horizontal reference plane 28. This novel feature advantageously operates to increase valve member lift without actually increasing the slope of the generatrix 78 of the first inclined ramp portion 76 to a theoretically necessary above-noted angle of about 40°.

In summary, the function of the valve member and ball retainer assembly 32, 36 is twofold. First, the novel configuration of inverted cup 40 defining first inclined ramp portion 46 operates to position the valve stem 42 in closing engagement with the valve seat 23 when the valve housing is tilted at an angle of about 20° in relation to the vertical during vehicle rollover. Second, the contact surface 64 of the ball retainer 36 engages the downwardly-facing surface of ball 34 as the valve member 32 travels from its outlet-closing to its outlet-opening position to provide sufficient downward force on the valve stem 42 to prevent the valve stem 42 from being held against the valve seat 23 surrounding the chamber outlet 22 during a vapor flow condition caused by vehicle rollover, excessive valve housing vibration, or the like.

Figure 4:
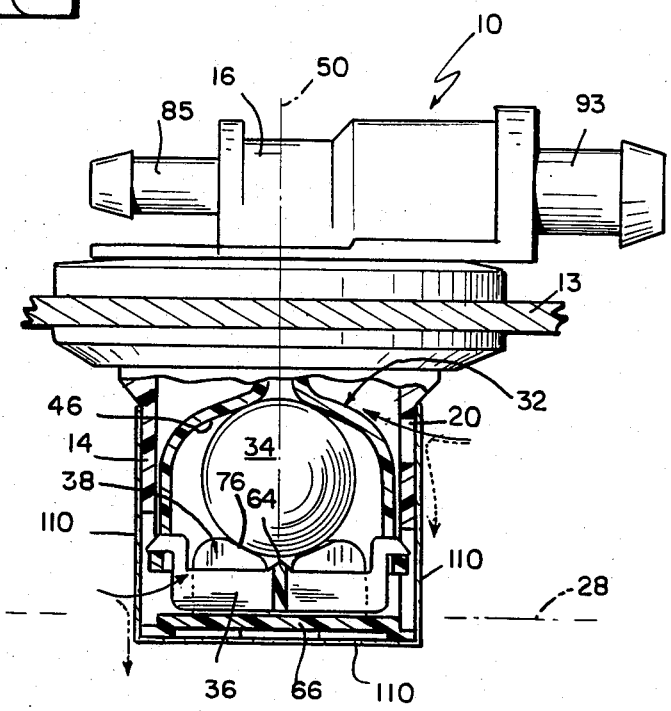
FIG. 4 is a sectional detail view of another embodiment of the present invention.

In another embodiment of the invention illustrated in FIG. 4, those elements referenced by numbers identical to those in FIGS. 1–3 perform the same or similar function. A discriminator filter 110 is positioned to cover the vapor flow inlet openings (e.g. 20) in the lower portion 14 of valve housing 12. One object of filter 110 is to retard liquid fuel flow into and through the valve assembly 10 during times of excessive fuel sloshing in the fuel tank, thereby advantageously minimizing unnecessary discharge of fuel through the valve assembly 10.

Preferably, the filter 110 is formed of a porous plastics material or the like which retards liquid fuel flow (represented by broken lines in FIG. 4) into the valve chamber 18 without substantially impairing the flow of fuel vapor (represented by solid lines in FIG. 4) through the vapor flow inlet openings. In the embodiment illustrated in FIG. 4, filter 110 is a porous skirt positioned to surround and embrace the exterior wall of the lower portion 14 of valve housing 12. It will be appreciated that filter 110 could be formed and positioned in a variety of other shapes and manners without impairing the operation thereof.

In another embodiment of the invention illustrated in FIG. 5, those elements referenced by numbers identical to those in FIGS. 1–3 perform the same or similar function. In the embodiment of the valve assembly shown in FIG. 5, valve housing 112 includes a lower roll-over safety portion 114 and an upper tank pressure control valve portion 116. The valve housing 112 can be mounted in a fuel sender unit (not shown) or in any other convenient position within the fuel tank.

The components housed in the lower roll-over safety portion 114 function in a manner similar to that shown in FIGS. 1–3. However, in this embodiment the second inclined ramp portion 76 is configured so as to position the upwardly-extending generatrix 78 in relation to the longitudinal axis 50 of the valve housing to define an included angle of about 60°. In other words, the second ramp portion is inclined at an angle of about 30° relative to the horizontal reference plane 28. This incline is about 10° steeper in comparison to the incline illustrated in the embodiment of FIGS. 1–3 so as to delay slightly the actuation of the roll-over valve to meet predetermined performance criteria. It will be understood that the inclined angles of either or both of ramp portions 46, 76 can be varied to change the "effective ramp surface" provided by the novel double ramps 46, 76 of the present invention.

The upper tank pressure control valve portion 116 functions to regulate the pressure within the fuel tank (not shown) thereby advantageously controlling maximum fuel tank pressure.

In particular, the upper portion 116 is formed to include a vapor discharge chamber 124 in fluid communication with the fluid-conducting passageway 26, an outlet passage 126 in fluid communication with the vapor discharge chamber 124, and an inlet passage 128 in fluid communication with the valve chamber 18 formed in the lower portion 114. Importantly, inlet mouth 130 of the inlet passage 128 is positioned about at the highest location within the fuel tank (not shown) to reduce the likelihood of liquid-fuel carryover into the valve assembly during fuel sloshing. Of course, a discriminator filter, similar in function to filter 110 of FIG. 4, could be installed at a suitable location to filter fuel vapor introduced into inlet passage 128.

A pressure-vacuum valve assembly 132 is installed in vapor discharge chamber 124 to regulate pressure in the fuel tank (not shown). The pressure-vacuum valve assembly 132 includes a gasket 134, an umbrella valve 136, a valve carrier 138, and a spring 140. The gasket 134 is positioned on a bottom wall 142 of valve vapor discharge chamber 124 to surround passageway 26. The valve carrier 138 includes a central portion forming four circumferentially-spaced fluid-conducting apertures 146, a peripheral ring flange 148 defining an exterior sidewall 150 positioned in close proximity to an interior wall 152 of the vapor discharge chamber 124 to define an annular passageway therebetween. The umbrella valve 136 is made of a pliable material and includes a stem 154 that is installed in a central aperture formed in the valve carrier 138 and a resilient valve cover 156 that is positioned normally to cover the lower opening of each of the circumferentially-spaced fluid-conducting apertures 146 formed in the valve carrier 138 as shown in FIG. 5. The spring 140 is installed in the vapor discharge chamber 124 between a top wall 158 thereof and a top surface of the valve carrier 138. Thus, the spring 140 provides means for yieldably urging the ring flange 148 into seating engagement with the gasket 134.

In operation, the spring-biased valve carrier 138 functions to vent fuel vapor from the fuel tank and valve assembly only when the pressure exceeds a predetermined threshold level. Pressurized fuel tank vapor can exert a lifting force on the valve carrier 138 to urge the same against the spring 140, thereby lifting ring flange 148 off gasket 134 to open the annular passageway between the valve carrier 138 and the interior chamber wall 152. The fuel vapor is then discharged from the valve housing 112 via outlet 126 and conducted to a treatment site such as a conventional fuel canister (not shown). The mass and configuration of a valve carrier 138, the size of the various fluid-conducting passages, and the spring constant of the spring are selected to define the threshold pressure level. Thus, the pressure-vacuum valve assembly 132 functions to regulate the maximum pressure allowable in the fuel tank (not shown).

The umbrella valve 136 regulates flow of ambient air or the like from the canister into the valve chamber 18 and the fuel tank in response to suction caused by a vacuum in the fuel tank. Sub-atmospheric pressure in the fuel tank will exert a downwardly-directed force to the resilient valve cover 156 to at least partially open the umbrella valve 136 and draw ambient air or the like through outlet passage 126 and valve carrier apertures 146 into the valve chamber 18 via the fluid-conducting passageway 26. A vacuum created in the fuel tank, due to condensation or the like, will act to draw fuel/fuel vapor from the canister back into the tank. This will prevent the pressure in the fuel tank from dropping to zero and hold the tank pressure constant during an overnight vehicle cool-down or short-term vehicle parking.

One notable feature of this embodiment is that fuel vapor is introduced into the valve chamber 18 only from a point above the valve member 32 so that the fuel vapor is shunted generally away from the interior of the ball-receiving cup 40 defined by the valve member 32. Advantageously, this feature causes the vapor path within the valve housing 112 generally to "push down" on the exterior surface of the valve member 32 and thereby substantially prevent fuel vapor from prematurely lifting the valve member 32 toward its vent-closing position within the valve chamber 18 prior to vehicle rollover.

Although the invention has been described in detail with reference to certain preferred embodiments, variations and modifications exist within the scope and spirit of the invention as described and defined in the following claims.

What is claimed is:

1. A roll-over valve for use in a vehicle fuel system, the roll-over valve comprising
a hollow valve housing having a longitudinal axis, an inlet for admitting fuel vapors from the vehicle fuel system into the valve housing, and an outlet for discharging the fuel vapors from the valve housing,
a valve member positioned within the hollow valve housing for movement between an outlet-opening position and an outlet-closing position, the valve member having a ball-receiving cup configured to define a first inclined ramp portion,
base means for retaining the valve member within the housing, the base means including a second inclined ramp portion, the base means being coupled to the valve housing to present the second inclined ramp portion in opposing spaced-apart relation to the first inclined ramp portion of the cup to define a ball-receiving space therebetween, and
a ball positioned in the ball-receiving space in substantially camming relation to each of the opposing first and second inclined ramp portions, the ball riding on both ramp portions in a radially-outward direction to move the valve member to its outlet-closing position in response to tilting the valve housing about its longitudinal axis during a vehicle rollover.

2. The valve of claim 1, wherein the first inclined ramp portion is substantially defined by a downwardly-extending generatrix.

3. The valve of claim 2, wherein the downwardly-extending generatrix has an included angle with the longitudinal axis of the valve housing of about 70°.

4. The valve of claim 3, wherein the second inclined ramp portion is substantially defined by an upwardly-extending generatrix having an included angle with the longitudinal axis of the valve housing of about 70°.

5. The valve of claim 1, wherein the cup includes a downwardly-extending cylindrical side wall depending from the first inclined ramp portion to define a downwardly-opening chamber, and further comprising closure means coupled to the side wall for retaining the ball in the downwardly-opening chamber during movement of the valve member between its outlet-opening and outlet-closing positions.

6. The valve of claim 5, wherein the closure means includes return means for transmitting the gravitational force of the ball to the valve member via the closure means to aid in moving the valve member from its outlet-closing position toward its outlet-opening position so that sufficient downward force is applied to the valve member to prevent the valve member from being held in its outlet-closing position during return of the vehicle to an upright position from a rolled-over position.

7. The valve of claim 5, wherein the closure means includes a contact surface that is configured to contact the ball during a selected range of tilting positions of the valve housing to apply a return force to the valve member via the closure means to aid in moving the valve member from its outlet-closing position toward its outlet-opening position.

8. The valve of claim 7, wherein the second inclined ramp portion is positioned at the outlet-opening position of the valve member to overlie the contact surface of the closure means so that the downwardly-presented surface of the ball is seated on the second inclined ramp portion without contacting the closure member.

9. The valve of claim 1, further comprising
a fuel tank in fluid communication with the inlet of the hollow valve housing,
vapor distribution means for discharging a substantially constant volumetric flow rate of fuel vapor from the hollow valve housing to a vapor storage canister within the vehicle fuel system as long as the pressure of said fuel vapor remains substantially constant, and
vapor release means for selectively discharging a controlled volume of fuel vapor from the hollow valve housing to the atmosphere to minimize fuel tank pressure and reduce the mass flow rate of fuel vapor to the vapor storage canister.

10. The valve of claim 9, wherein the vapor distribution means includes an overflow tube having an inlet orifice of uniform cross-section in fluid communication with the hollow valve housing outlet and an outlet in fluid communication with the vapor storage canister.

11. The valve of claim 9, wherein the vapor release means includes a purge tube having an inlet orifice in fluid communication with the hollow valve housing outlet, an outlet orifice in fluid communication with the atmosphere, a diverging nozzle extending in a direction toward the outlet orifice, valve means for blocking fuel vapor flow through the diverging nozzle, and spring means for yieldably biasing the valve means to a diverging nozzle-closing position so that fuel vapor pressure in the hollow valve housing in excess of a predetermined level exerts sufficient force on the valve means to overcome the opposing force of the spring means to permit a controlled volume of fuel vapor corresponding to the pressure in the fuel tank to be discharged to the outlet atmosphere via the outlet orifice.

12. The value of claim 1, wherein the vehicle fuel system includes a fuel tank in communication with the valve housing inlet and further comprising vent means for regulating the maximum pressure in the fuel tank.

13. The valve of claim 12, wherein the vent means includes first valve means for regulating the flow of fuel vapor discharged from the valve housing through the valve housing outlet.

14. The valve of claim 13, wherein the vent means further includes second valve means for regulating the flow of air drawn into the valve chamber through the vent means due to vacuum conditions in the fuel tank.

15. A roll-over valve for use in a vehicle fuel system, the roll-over valve comprising
an upper portion and a lower portion, the lower portion including a side wall and an upper end wall which define a downwardly-opening chamber, the upper end wall including a venting orifice,
a valve member axially movable in the chamber, the valve member having a closing piece engageable with the venting orifice for closing the venting orifice when the valve member moves upwardly in the chamber, and a cup having a downwardly-facing and inclined top ramp portion and an axially-extending wall portion,
a retainer engageable with the lower portion for retaining the valve member in the chamber, the retainer including an upwardly-facing and inclined bottom ramp portion, and
a ball disposed between the cup and the retainer, the ball being cooperable with the top ramp portion of the cup and the bottom ramp portion of the retainer for translating radial movement of the ball into axially upward movement of the valve member to move the closing piece into and out of engagement with the venting orifice.

16. The valve of claim 15, wherein the upper portion includes valve means for venting vapors from the fuel system when the pressure in the fuel system exceeds a selected pressure and wherein the venting orifice is large enough to accommodate the flow of vented vapors at the selected pressure.

17. The valve of claim 15, wherein the side wall of the lower portion includes at least one aperture disposed above the top ramp portion of the cup when the closing piece is out of engagement with the orifice.

18. The valve of claim 17, wherein the vehicle fuel system includes a fuel tank in communication with the at least one operature and further comprising vent means for regulating the maximum pressure in the fuel tank.

19. The valve of claim 17, wherein the axially extending portion of the cup includes a portion disposed generally coextensively with the aperture of the side wall, the coextensive portion including an aperture aligned with the aperture of the side wall.

20. The valve of claim 15, wherein the top ramp portion of the cup is substantially defined by a downwardly-extending generatrix.

21. The valve of claim 20, wherein the downwardly-extending generatrix has an included angle with a longitudinal axis of the lower portion of about 70°.

22. The valve of claim 21, wherein the bottom ramp portion is substantially defined by an upwardly-extending generatrix having an included angle with the longitudinal axis of the lower portion of about 70°.

23. The valve of claim 15, further comprising
a fuel tank in fluid communication with the lower portion,
vapor distribution means for discharging a substantially constant volumetric flow rate of fuel vapor from the lower portion to a vapor storage canister within the vehicle fuel system as long as the pressure of said fuel vapor remains substantially constant, and
vapor release means for selectively discharging a controlled volume of fuel vapor from the lower portion to the atmosphere to minimize fuel tank pressure and reduce the mass flow rate of fuel vapor to the vapor storage canister.

* * * * *